(12) United States Patent
Fernandes, Jr.

(10) Patent No.: US 8,017,085 B2
(45) Date of Patent: Sep. 13, 2011

(54) SUBSTRATE MOUNTING SYSTEM

(75) Inventor: Sergio David Fernandes, Jr., Leesburg, GA (US)

(73) Assignee: Unifrax I LLC, Niagara Falls, NY (US)

( * ) Notice: Subject to any disclaimer, the term of this patent is extended or adjusted under 35 U.S.C. 154(b) by 445 days.

(21) Appl. No.: 12/200,083

(22) Filed: Aug. 28, 2008

(65) Prior Publication Data

US 2009/0060800 A1 Mar. 5, 2009

Related U.S. Application Data

(60) Provisional application No. 60/967,177, filed on Aug. 31, 2007.

(51) Int. Cl.
*B01D 50/00* (2006.01)
(52) U.S. Cl. .................................................. 422/179
(58) Field of Classification Search ................ 422/177, 422/179, 180
See application file for complete search history.

(56) References Cited

U.S. PATENT DOCUMENTS

| | | |
|---|---|---|
| 4,159,205 A | 6/1979 | Miyahara et al. |
| 4,277,269 A | 7/1981 | Sweeting |
| 4,863,700 A | 9/1989 | Ten Eyck |
| 5,032,441 A | 7/1991 | Ten Eyck et al. |
| 5,242,871 A | 9/1993 | Hashimoto et al. |
| 5,384,188 A | 1/1995 | Lebold et al. |
| 5,470,364 A | 11/1995 | Adiletta |
| 5,482,686 A | 1/1996 | Lebold et al. |
| 5,541,424 A | 7/1996 | Graber |
| 5,556,689 A | 9/1996 | Kratel et al. |
| 5,580,532 A | 12/1996 | Robinson et al. |
| 5,660,800 A | 8/1997 | Mieville et al. |
| 5,666,726 A | 9/1997 | Robinson et al. |
| 5,685,932 A | 11/1997 | Stohr et al. |
| 5,811,063 A | 9/1998 | Robinson et al. |
| 5,814,548 A | 9/1998 | Graber |
| 5,911,903 A | 6/1999 | Eyhorn et al. |
| 6,214,303 B1 | 4/2001 | Hoke et al. |
| 6,231,818 B1 | 5/2001 | TenEyck |
| 6,589,488 B1 * | 7/2003 | Eyhorn .................. 422/179 |
| 6,592,641 B2 | 7/2003 | Alvin et al. |
| 6,773,618 B2 | 8/2004 | Eyhorn et al. |

(Continued)

FOREIGN PATENT DOCUMENTS

DE 198 53 422 A1 5/2000

(Continued)

OTHER PUBLICATIONS

International Search Report and Written Opinion Mailed Apr. 9, 2009 (International Application No. PCT/US2008/010178).

(Continued)

*Primary Examiner* — Tom Duong
(74) *Attorney, Agent, or Firm* — Curatolo Sidoti Co., LPA; Joseph G. Curatolo; Salvatore A. Sidoti

(57) ABSTRACT

A support system for a fragile substrate of an exhaust gas treatment device includes a microporous, inorganic insulating layer, which directly or indirectly engages at least a portion of the fragile substrate: and a flexible fibrous mounting mat which directly or indirectly engages at least a portion of said fragile substrate. The support system may support the fragile substrate of a catalytic converter, a diesel particulate trap filter, a selective catalyst reduction unit, or a $NO_x$ trap.

20 Claims, 6 Drawing Sheets

U.S. PATENT DOCUMENTS

| | | |
|---|---|---|
| 6,855,298 B2 | 2/2005 | TenEyck |
| 7,033,412 B2 | 4/2006 | Kumar et al. |
| 7,074,369 B2 | 7/2006 | Tabatabaie-Raissi et al. |
| 7,132,150 B2 | 11/2006 | Ogunwumi et al. |
| 2003/0106311 A1 | 6/2003 | Moore et al. |
| 2004/0234436 A1 | 11/2004 | Howorth |
| 2005/0167354 A1 | 8/2005 | Caze et al. |
| 2006/0008395 A1 | 1/2006 | Ten Eyck et al. |
| 2006/0154040 A1* | 7/2006 | Merry ................. 428/292.1 |
| 2009/0060800 A1 | 3/2009 | Fernandes, Jr. |

FOREIGN PATENT DOCUMENTS

| | | |
|---|---|---|
| EP | 0 643 204 A2 | 3/1995 |
| EP | 1 295 637 A1 | 3/2003 |
| EP | 1 495 807 A1 | 1/2005 |
| EP | 1 830 043 A1 | 9/2007 |
| EP | 1 950 035 A1 | 7/2008 |
| GB | 2 171 180 A | 8/1986 |
| WO | WO 93/13560 A1 | 7/1993 |
| WO | WO-96/06814 | 3/1996 |
| WO | WO-96/22146 | 7/1996 |
| WO | WO-96/22149 | 7/1996 |
| WO | WO 03/031368 A2 | 4/2003 |
| WO | WO2007/030410 A1 | 3/2007 |
| WO | WO2007/044485 A1 | 4/2007 |
| WO | WO 2009/032147 A2 | 3/2009 |
| WO | WO 2010/024920 A1 | 3/2010 |

OTHER PUBLICATIONS

Data Sheet—"WDS Flexible Contour", Porextherm, Version 1.02, Feb. 12, 2008, available at "http://www.porextherm.com/web/pdfdownload.htm?ID=60&doctype=PDF=EN&lang=en&externeswindow=2&ts=1223910419" (last accessed Oct. 13, 2008).

Product Information—"Flexible Min-K", Thermal Ceramics, 05.02/6 14-120 (no longer available on company website).

Product Information —"MICROSIL Microporous Insulation", Zircar Ceramics, available at "http://www.zircarceramics.com/pages/microporousinsulation/microporous.htm" (last accessed Mar. 5, 2007—no longer accessible).

Technical Data Sheet—"HDK N20 Pyrogenic Silica", Wacker Silicones, Version 1.0, Jun. 12, 2008.

Product Brochure—"There's More to it Than You Think. HDK—Pyrogenic Silica", Wacker Silicones, 6173/10.05/e.

International Search Report, Form PCT/ISA/210 and Written Opinion, Form PCT/ISA/237 for PCT International Patent Application No. PCT/US2010/002221.

International Search Report, Form PCT/ISA/210, for PCT International Patent Application No. PCT/US2010/002226 corresponding to U.S. Appl. No. 12/855,455.

International Written Opinion, Form PCT/ISA/237, for PCT International Patent Application No. PCT/US2010/002226 corresponding to U.S. Appl. No. 12/855,455.

* cited by examiner

SUBSTRATE MOUNTING SYSTEM

CROSS REFERENCE TO RELATED APPLICATIONS

This application claims the benefit of the filing date, under 35 U.S.C. §119(e), of U.S. Provisional Application for Patent Ser. No. 60/967,177, filed on Aug. 31, 2007.

TECHNICAL FIELD

Provided is a system for mounting a frangible substrate. The system is capable of supporting or mounting substrates within a housing while substantially isolating the substrate from potentially destructive mechanical loads and impact. Additionally, the system is capable of significantly insulating the housing from heat flowing from said substrate.

BACKGROUND

Monolithic substrates serve as the active surface in a variety of exhaust gas treatment devices. Optionally impregnated with catalysts, the substrates comprise the active surfaces in catalytic converters, diesel particulate filters, selective catalyst reduction units, $NO_x$ traps, and other exhaust gas treatment devices.

In general, the operating temperature for a substrate is substantially higher than ambient temperatures; high enough that most conventional materials suffer adverse effects from the temperature sufficient to make them unacceptable candidates from which to make a substrate. The materials comprising monolithic substrates are commonly frangible or brittle materials exhibiting a high heal resistance, a low thermal expansion coefficient, and a low impact resistance. Without limitation, a common material type which is an acceptable candidate from which to make a monolithic substrate is ceramic, although metallic substrates are sometimes used.

The geometry comprising substrates typically promotes a high surface area to volume ratio. In certain embodiments, the substrate geometry comprises a plurality of elements which are thin and fragile. Without limitation, a common geometry for substrates is a monolith comprising an array of hollow rectangular prism cells defining tiny flow channels, separated by thin, fragile walls, such as in a honeycomb-type configuration.

Together, the geometric and material considerations for substrates commonly result in a substrate which is susceptible to impact, crushing, or other mechanical failure from small shockloads or stress, and which operates at very high temperatures. To address the problem of the fragile nature of the substrate, it is common to protect the substrate within a housing, typically a metallic housing with a space or gap between the external surface of the substrate and the internal surface of the housing. In order to protect the substrate from thermal and mechanical shock and other stresses, as well as to provide thermal insulation, it is known to position at least one sheet of mounting material within the gap between the substrate and the housing.

Because exhaust gas treatment devices are designed to operate at temperatures substantially higher than ambient temperatures and are designed to cool to ambient temperatures when not operating, exhaust gas treatment devices are designed to undergo significant temperature fluctuations. The mounting of the substrate is designed to protect the substrate over the entire scope of temperatures to which the device is exposed: from ambient through operating temperatures. The temperature fluctuations present a considerable challenge in designing the substrate mounting system.

Direct mounting of the substrate to the housing is possible but uncommon. Direct mounting is uncommon in part because the changes in temperature between operation cycles induce differing thermal changes in component size due to coefficient of thermal expansion differences for the substrate and the metal housing, sufficient to induce undesirable changes in mounting or holding forces. Absent a means to compensate for these differences, the mounting forces can change to levels insufficient to prevent undesirable vibration, shock, impact, or other motion. Another reason that direct mounting is uncommon is that heat from the substrate readily propagates to the housing under such mounting conditions. The resultant heating of the housing can result in the housing reaching undesirably high temperatures.

A more common means of mounting the substrate comprises inclusion of an insulating mounting mat between the substrate and the metallic housing. The mounting mat may be wrapped about the substrate and may be compressed by enclosing the housing around it. The level of compression is selected to provide an engagement force between the housing and the mat; and, the mat and the substrate, which produces mounting or holding forces both sufficiently high to secure the substrate with respect to the housing, and sufficiently low to avoid damage to the substrate. Also, a mounting mat will inherently have some resistance to heat flow and, in certain embodiments is a good insulator; the mat resists propagation of heat from the substrate to the housing and thereby lowers the steady state operating temperature of the housing for a given steady state operating temperature of the substrate.

Selection of a type of mounting material and the ambient temperature compression load to which to subject the mounting material to yield acceptable mounting or holding forces at all temperatures that the exhaust gas treatment device experiences continues to be a source of difficulty. Compounding this difficulty is the need for an insulative material between the substrate and the housing having a low thermal conductivity but which will not add undesirable weight or bulk to the device.

SUMMARY

A support system for a fragile substrate of an exhaust gas treatment device is provided which comprises a microporous, inorganic insulating layer, adapted to directly or indirectly engage at least a portion of the fragile substrate; and a flexible fibrous mounting mat adapted to directly or indirectly engage at least a portion of the fragile substrate.

In certain embodiments, the provided support system supports the fragile substrate of a catalytic converter, a diesel particulate trap filter, a selective catalyst reduction unit, a $NO_x$ trap or a chemical industry emission stack.

DETAILED DESCRIPTION

A substrate mounting system is provided, which is adapted for mounting a fragile substrate within a housing, and which incorporates a thin, light, insulative layer and a fibrous mounting mat between the substrate and the housing. The insulative layer promotes the insulative character of the material between the substrate and the housing and thereby decreases the steady state operating temperature of the housing and other materials external to the insulative layer for a given steady state operating temperature of the substrate. In such embodiments, the insulation reduces the thermal strain which the materials external to the insulative layer undergo, mitigating changes in the mounting or holding forces to which the substrate is subjected. In some embodiments, the insulative layer insulates the mat from the substrate and thereby decreases the operating temperature of the mat for a given operating temperature of the substrate. In such embodiments, the thermal strain which the mat undergoes is reduced, reducing changes in the mounting or holding forces to which the substrate is subjected.

A mounting system is provided for mounting a fragile substrate in an exhaust gas treatment device. The exhaust gas treatment device generally comprises a fragile substrate, a mounting mat, an insulating layer, and a housing. Optionally, the device may further comprise additional components.

A substrate is a component in an exhaust gas treatment device which modifies exhaust material. There are many kinds of exhaust gas treatment devices which may comprise a substrate. One type of exhaust gas treatment device is a catalytic converter; the active portion of a catalytic converter comprises a substrate coated or impregnated with a catalyst to promote oxidation of carbon monoxide and hydrocarbons and the reduction of oxides of nitrogen, eliminating undesired products of combustion in the exhaust stream.

Figure 1:
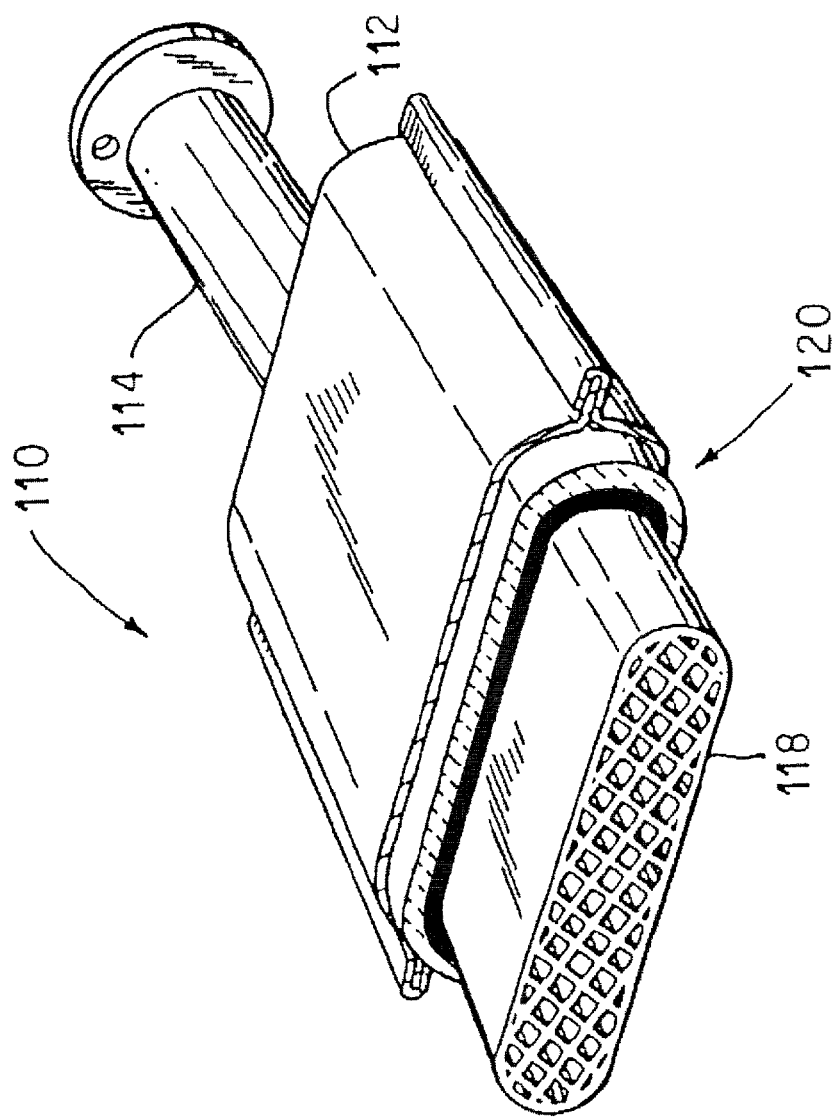
FIG. 1 is an elevational, cross-sectional view of a catalytic converter as an example of an exhaust gas treatment device having a substrate supported by one embodiment of the subject mounting system.

As shown in FIG. 1, catalytic converter 110 includes a generally tubular housing 112, typically formed of two pieces of metal, e.g. high temperature-resistant steel. Housing 112 includes an inlet 114 at one end and an outlet (not shown) at its opposite end. The inlet 114 and outlet are suitably formed at their outer ends whereby they may be secured to conduits in the exhaust system of an internal combustion engine.

Device 110 contains a frangible ceramic monolith substrate 118 which is supported and restrained within housing 112 by the substrate mounting system 120 to be further described. Substrate 118 may include a plurality of gas-pervious passages which extend axially from its inlet end fact at one end to its outlet end face at its opposite end. Substrate 118 is constructed of a suitable refractory or ceramic material in known manner and configuration.

Substrate monoliths are typically oval or round in cross-sectional configuration, but other shapes are possible. The substrate is spaced from its housing by a gap width distance which in some embodiments can be at least about 0.05 inch (1.27 mm), and in other embodiments can be up to one inch (25.4 mm) or more. This gap width may typically range from about 3 mm to about 25 mm with a range of about 3 mm to about 8 mm being commercially common widths. The substrate mounting system 120 is disposed in this space to support the ceramic monolith substrate 118.

A diesel particulate filter is another type of exhaust gas treatment device. The active portion of a diesel particulate filler comprises a substrate acting as a filter. A diesel particulate trap may include one or more porous tubular or honeycomb-like structures (having channels closed at one end, however), which are mounted by a thermally resistant material within a housing. Particulate is collected from exhaust gases in the porous structure, typically until regenerated by a high temperature burnout process.

Another type of exhaust gas treatment device is a selective catalyst reduction unit; the active portion of a selective catalyst reduction unit comprises a substrate, coated with a catalyst to promote chemical reduction and elimination of undesired products in the exhaust stream.

Another type of exhaust gas treatment device is a $NO_x$ trap: the active portion of a $NO_x$ trap comprises a catalytic substrate comprising alkali or alkaline earth materials. The trap operates in a cyclic manner; cycling between a "sorbtion" process and a "regeneration" process. During sorbtion the substrate intakes $NO_x$ species and traps them on the surface of the catalytic substrate as nitrate species. During regeneration, a reducing material is introduced into the $NO_x$ trap and the nitrate species are removed from the substrate and reduced to nitrogen.

Non-automotive applications for the subject mounting system include but are not limited to catalytic converters for chemical industry emission (exhaust) stacks.

In an exhaust gas treatment device, the substrate may operate at temperatures substantially above ambient temperature. Without limitation, the operating temperature for certain embodiments of exhaust gas treatment devices is about 1000 degrees Centigrade. Because of the substantially elevated temperatures at which it operates, the substrate typically comprises materials having excellent resistance to heat: a very high melting point, very high heat resistance, and very low thermal expansion coefficient. There are many materials which have these properties including a wide variety of ceramics, tungsten, rhenium, and more exotic materials. One group of very common materials which exhibit excellent resistance to heat is ceramics. Exhaust gas treatment device substrates typically comprise a frangible material, such as a monolithic structure formed of a brittle, fireproof ceramic material such as, but not limited to, aluminum oxide, silicon dioxide, magnesium oxide, zirconia, cordierite, silicon carbide and the like.

A property of many common ceramics is their low toughness. That is, while many ceramics are hard, strong, or both hard and strong, ceramics tend to display low toughness and tend to fracture at low strain levels. This makes ceramic components prone to breakage or fracture under mechanical loading conditions typically experienced by an exhaust gas treatment device. Therefore, it is common to incorporate means to protect the substrate.

A housing is a hollow body which at least partially shrouds the substrate. The housing protects the substrate from impact, torsion, tension, compression, or other mechanical loading which may damage the substrate. In certain embodiments the housing comprises a thin shell. The housing comprises materials having good resistance to heat: a high melting point and high heat resistance. The materials comprising exhaust gas treatment device housings are commonly ductile materials comprising a lower heat resistance than the monolith, a higher thermal expansion coefficient than the monolith, and a higher impact resistance than the monolith. Without limitation, in certain embodiments the exhaust gas treatment device housing comprises a metal or metal alloy, such as high temperature-resistant steel.

The present mounting system may comprise at least one relatively stiff insulating layer, and at least one flexible, fibrous mounting mat.

Figure 6:
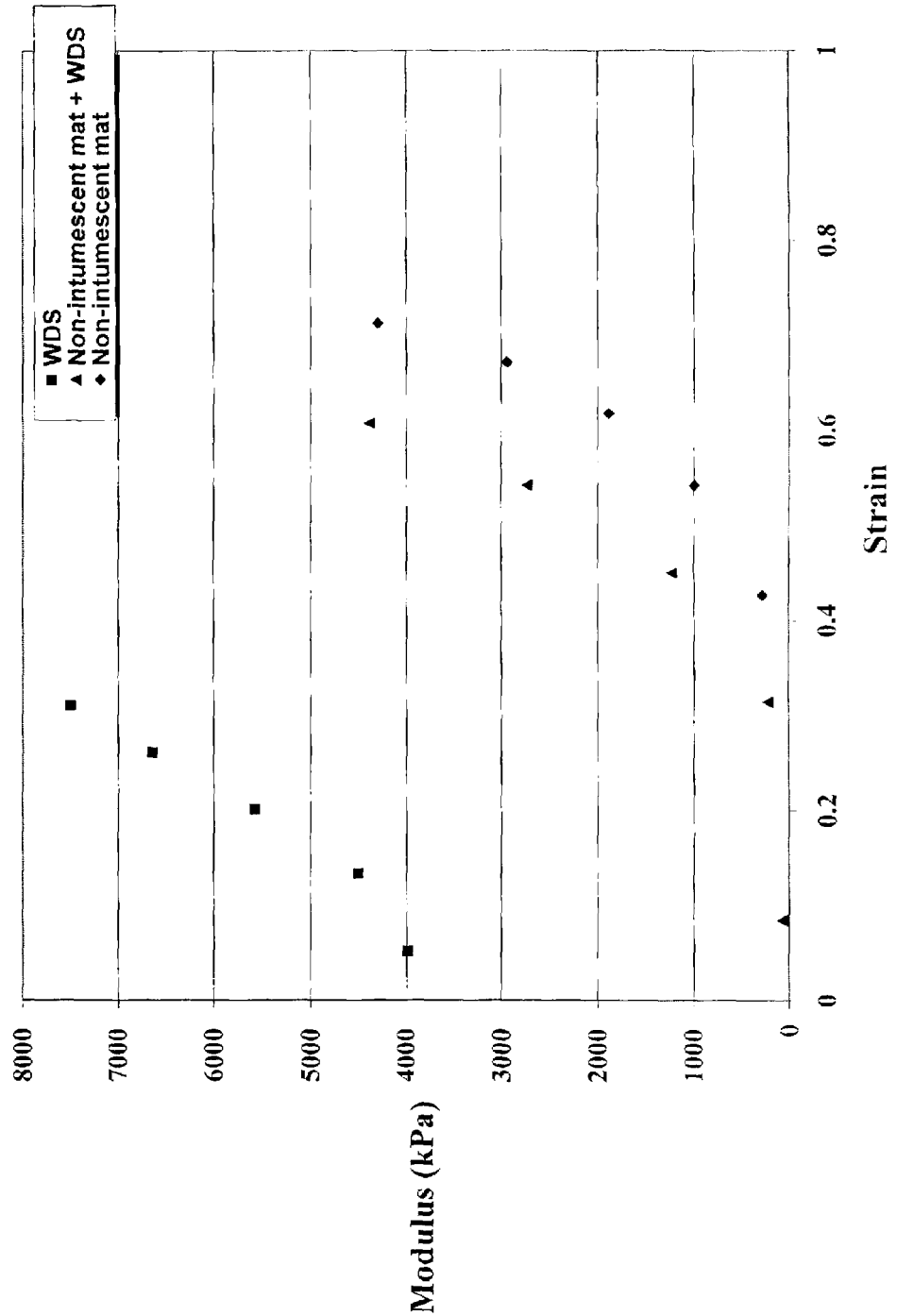
FIG. 6 is a graph illustrating modulus vs. strain for various materials.

An insulating layer is a layer of material characterized by a low thermal conductivity. As with any other design process, during design of an exhaust gas treatment device, considerations of weight savings and space savings must be balanced against cost considerations. Materials which exhibit low density or low bulk and take up little space, are desirable. In certain embodiments, the insulating layer exhibits both low density and low bulk. In certain embodiments, the stiffness of the insulating layer is between 3 MPa and 5 MPa for strains less than 0.1. FIG. 6 represents an example of the modulus vs. strain for one embodiment of insulating layer. FIG. 6 shows that, at strains less than 0.1, the insulating layer (WDS® Flexible Contour from Porexlherm GmbII of Kempten. Germany) has a modulus of approximately 4 MPa, compared to the mounting mat alone having a modulus approaching zero (0) and the combined mounting system also having a modulus approaching zero (0).

Support systems provide engagement forces which are developed by compression of the materials comprising the support system. While many materials are compressible, only materials which are compressible and are substantially elastic can return the energy thereby imparted to them to the system as an engagement force. Non-stiff materials will undergo large strains at low stresses and incorporate the energy causing the strain, the strain energy. Non-stiff, substantially elastic materials, will undergo large strains at low stresses, incorporate the strain energy, and return a substantial portion of the strain energy as a restoring force. This restoring force contributes to the mounting or holding force. Stiff materials will undergo small strains, at low stresses and incorporate the strain energy. Stiff, substantially elastic materials, will undergo small strains at low stresses, incorporate the strain energy, and return a substantial portion of the strain energy as a restoring force.

A subject mounting system incorporates one or more layers of material, all mechanically loaded at once such that all layers experience substantially identical stress. This kind of loading is "series loading". In series loading, non-stiff layers will undergo greater strain and therefore incorporate greater strain energy than will the stiffer layers. Because there is a positive correlation between the amount of strain energy incorporated into a material during a given loading cycle and the hysteretic erosion of the material, stiffer materials may be protected from certain kinds of erosion by incorporating them in series with a non-stiff material. In certain embodiments a stiff insulating layer (relative to the mounting mat) is incorporated into the mounting system in series with a non-stiff mounting mat.

The insulating layer may include at least material from a class of materials available as thin, somewhat flexible sheets which exhibit low thermal conductivity and are substantially non-intumescent. In certain embodiments the insulating layer is a microporous inorganic insulation layer comprising a thin, flexible sheet exhibiting extremely low thermal conductivity.

Such microporous inorganic insulation is available as thin, flexible sheets having a thermal conductivity at 20 degrees Centigrade and at a density of about 350 kg/m$^3$ of less than about 0.021 W/mK. In certain embodiments the insulating layer is a microporous insulation comprising a thin, flexible sheet exhibiting a thermal conductivity at 20 degrees Centigrade and at about 350 kg/m$^3$ of less than about 0.021 W/mK, and having a thermal conductivity less than 0.055 W/mK for temperatures less than about 1000 degrees Centigrade.

In certain embodiments the insulating layer is a microporous inorganic insulation comprising a thin, flexible sheets exhibiting a thermal conductivity at 20 degrees Centigrade and at a density of about 350 kg/m$^3$ of less than about 0.021 W/mK, and a thermal conductivity less than 0.055 W/mK for temperatures less than 1000 degrees Centigrade, having a bulk density between about 260 kg/m$^3$ and about 520 kg/m$^3$. Microporous inorganic insulation having a greater density may be acceptable if sufficiently flexible to wrap around and conform to the outer surface of the substrate. In certain embodiments the insulating layer having these properties is available as thin, flexible sheets having a thickness between about 3 mm and about 20 mm.

In certain embodiments the insulating layer is substantially incompressible. One type of microporous inorganic insulation exhibits the compression performance shown in TABLE I at a density of about 350 kg/m$^3$. In TABLE I, the listed pressures are those required to compress the material by the listed percentages at the listed temperatures.

TABLE I

| Compression | 20° C. | 400° C. | 800° C. |
|---|---|---|---|
| 1% | 0.034 MPa | 0.028 MPa | 0.028 MPa |
| 3% | 0.089 MPa | 0.083 MPa | 0.110 MPa |
| 5% | 0.151 MPa | 0.144 MPa | 0.165 MPa |
| 10% | 0.275 MPa | 0.295 MPa | 0.350 MPa |

The microporous inorganic insulating layer comprises finely divided metal oxide and an opacifier, that is, a material that minimizes infra-red radiation; and optionally further comprises reinforcing inorganic fiber, such as glass filaments. The inorganic insulating layer, in its pre-installed form, may be sealed in a polymeric film, such as polyethylene, although the film may be selected for economy and functionality rather than composition. It is also possible that a minor amount of organic fibers or particles may be incorporated into the microporous insulating layer for processing considerations.

The finely divided metal oxide may comprise at least one of pyrogenic silicas, arc silicas, low-alkali precipitated silicas, silicon dioxide aerogels, aluminum oxides similarly prepared, and mixtures thereof. In one embodiment, the finely divided metal oxide comprises fumed silica. The finely divided metal oxide may have a specific BET surface area of from about 50 to about 700 m$^2$/g, in particular from about 70 to about 400 m$^2$/g.

The particle sizes of the materials in the microporous insulating layer are small enough that mechanisms of heat transfer are controlled. The particulate and fibrous material are sized to create pores which are less than about 0.1 microns in diameter, less than the mean free path of air. By limiting the quantity and motion of air in the pores, both conduction due to air and convection heat transfer is limited, thus reducing thermal conductivity.

The opacifier may comprise at least one of ilmenite, titanium dioxide, iron(II)/iron(III) mixed oxides, chromium dioxide, zirconium oxide, manganese dioxide, iron oxide, rutile, zirconium silicate, silicon carbide, and mixtures thereof. The opacifier may have a particle size less than about 15 microns, in certain embodiments, in the range from about 0.1 to about 10 microns.

The reinforcing fiber of the insulation layer may comprise a broad family of materials. The family of materials includes any inorganic fiber capable of providing the structure necessary to retain the microporous particles in a cohesive unit. In some embodiments the reinforcing fiber is selected from the group consisting of aluminum silicate, magnesium silicate, rockwool, or combinations thereof. In certain embodiments, reinforcing fiber of the insulation layer may comprise at least one of textile glass fibers or quartz fibers, such as high-temperature-resistant fibers having an $SiO_2$ content of greater than 60% by weight, and in some embodiments greater than 90% by weight, silica fibers, textile fibers made from R glass, textile fibers made from S2 glass, textile fibers made from ECR glass, and fibers made from aluminum silicate. The fiber diameter may be greater than about 1.5 microns.

An insulating sheet commercially available from Porextherm GmbH (Kempten, Germany), comprises 55 weight % of HDK N25 highly dispersed silica (BET 280 $m^2/g$), 40 weight % of zirconium silicate, 5% of textile glass fibers (silicon content>92%) having a density of 320 $kg/m^3$ and a thickness of 10 mm. This sheet is substantially incompressible.

Another such microporous inorganic insulating material is WDS® Flexible Contour insulation, available from Porextherm GmbH (Kempten. Germany). WDS® Flexible Contour microporous insulation (WDS) is an exemplative material comprising about 50% silica, about 45% zirconium silicate, and about 5% of other materials, including reinforcing glass fibers, which may be used as an insulating layer that exhibits the low thermal conductivity discussed above in a low density, thin material. Without limitation, WDS® Flexible Contour is commercially produced in 3 mm, 5 mm, 7 mm, 10 mm, and 20 mm thicknesses. Similar microporous insulation material is available from Microtherm (Alcoa, Tenn.).

The microporous inorganic insulating layer engages the substrate either directly, or indirectly through an intermediate component, such as but not limited to, the mounting mat. The insulating layer is installed into the exhaust gas treatment device between the housing and the substrate. Placement of the insulating layer amongst other components of the exhaust gas treatment device determines which components are on the substrate side (hot side) of the insulating layer and which components are on the housing side (cold side) of the insulating layer. Test results and a description of some of the advantages of each embodiment are set forth below.

A support or mounting mat is a substantially elastic, compressible material layer. The mounting mat is subject to heating by the substrate, and at least indirectly by the exhaust gases, and therefore may also operate at temperatures above ambient temperatures. A support or mounting mat typically comprises materials able to withstand elevated temperature environments while remaining substantially elastic and compressible. Mounting mats may comprise materials ranging from relatively inexpensive materials such as, for example, amorphous glass fibers such as S-glass, to more expensive materials such as, for example, high alumina ceramic oxide fibers, intumescent materials as well as non-intumescent materials have been and continue to be employed in mounting mats, depending upon the application and conditions under which the mounting mats are to be used.

Figure 5:
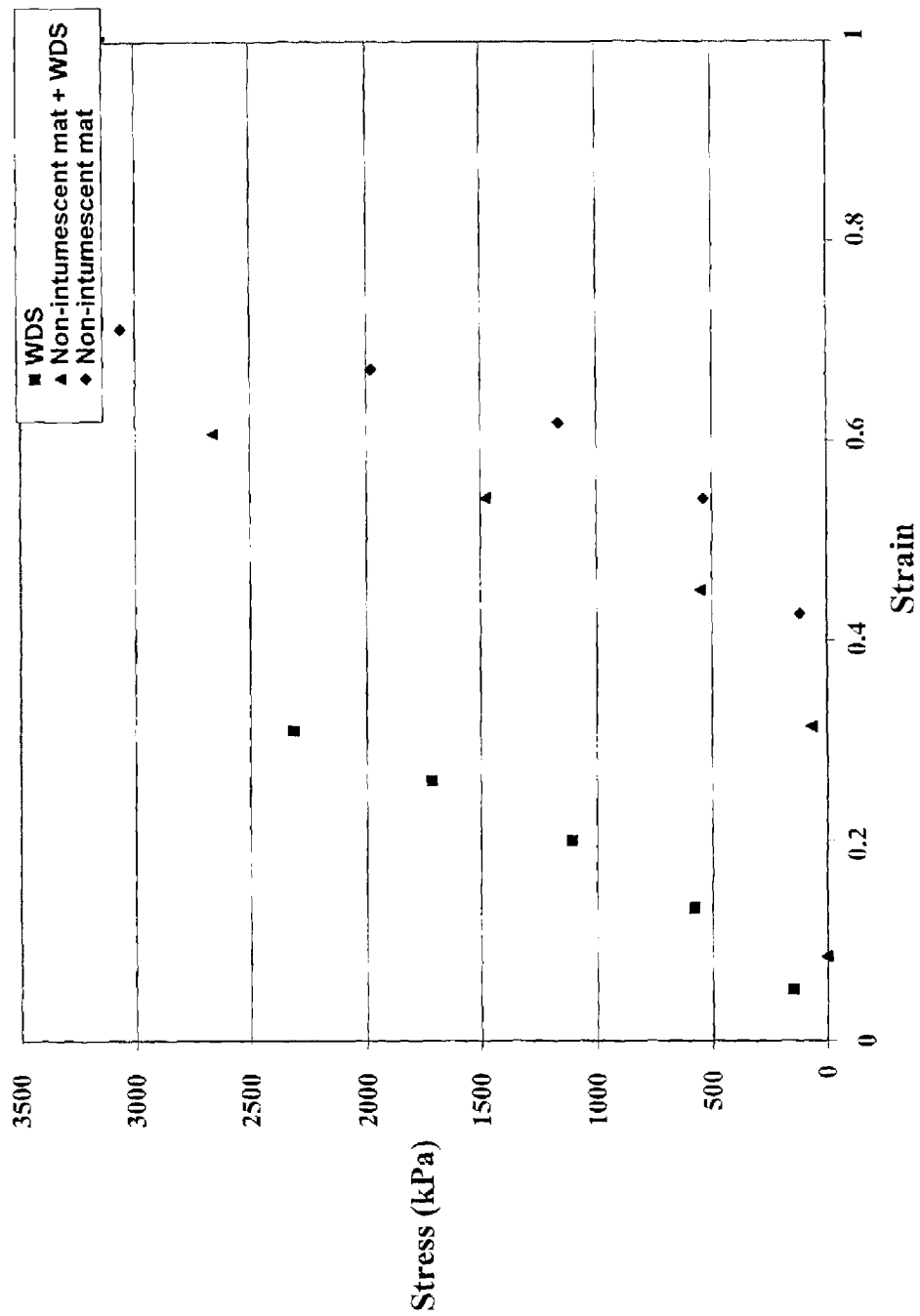
FIG. 5 is a graph illustrating stress vs. strain for various materials.

Because the mat is substantially elastic and compressible, when compressed it provides a restoring force which is substantially, but not always linearly, proportional to the amount of compression. Without limitation, an example of a non-linear stress-strain response curve for a mounting mat is shown in FIG. 5. FIG. 5 shows a plot of stress vs. strain for a non-intumescent mat: the plot is the set of diamond points. The mounting mat is the least stiff of the three material sets plotted (mounting mat—diamond points, insulating layer—square points, and mounting mat with insulating layer—triangular points). When the compression is removed the mat will substantially return to its original size. It is not necessary that the mat return to 100% of its original size; some plastic performance is acceptable and is very common.

The mounting mat engages the substrate, either indirectly through an intermediate component or directly, and substantially immobilizes it with respect to the housing. At least one mounting mat is disposed in the exhaust gas treatment device between the housing and the substrate. The installed mounting mat is compressed such that it imparts a load, either indirectly through an intermediate component or directly, on the housing and the substrate. As noted above, the amount of the compressive load is substantially proportional to the amount of compression. A friction force resulting from the normal force is also substantially proportional to the amount of compression. These forces, the compression force and the friction force, together or separately, substantially immobilize the substrate with respect to the housing. By "substantially immobilize" it is meant that the amount that the substrate may move with respect to the housing is very small, on the order of the largest elastic strain limit of the materials providing holding forces. In certain embodiments, the largest elastic strain limit of the materials providing holding forces is about 1% of the material thickness. In certain embodiments at least one mounting mat is wrapped around the substrate and, optionally, other layers are wrapped around the substrate, and are compressed by the housing to provide a holding force on the substrate.

The term fibrous mounting mat means at least one sheet or layer primarily comprising high temperature resistant fiber, such as but not limited to ceramic fiber, and optionally including either within said at least one sheet or layer, or in an additional sheet or layer, intumescent material, reinforcing material, and the like. The high temperature resistant fiber, or ceramic fiber, sheet or layer may be in various forms such as paper, blanket, mat or felt, provided such form imparts the necessary thermal insulation and mechanical support.

In certain embodiments, the fibrous mounting mat may comprise Fiberfrax® paper available from Unifrax I LLC, Niagara Falls, N.Y. This product is made from bulk alumino-silicate glassy fiber having approximately 50/50 alumina/silica and a 70/30 fiber/shot ratio. About 93 weight percent of this paper product is ceramic fiber/shot, the remaining 7 percent being in the form of an organic latex binder. For higher substrate monolith temperatures, papers produced from Fibermax® polycrystalline mullite ceramic fibers available from Unifrax or alumina fibers may be employed. Other ceramic fibers that may be used include those formed from basalt, industrial smelting slags, alumina, zirconia, zirconia-silicates, alumino-silicates and chrome, zircon and calcium modified alumino-silicates and the like.

The intumescent material may include at least one of unexpanded vermiculite, hydrobiotite, water-swelling tetrasilicic fluorine mica, alkaline metal silicates, or expandable graphite, and may be formed into a sheet using organic and/or inorganic binders to provide a desirable degree of wet strength. A sheet of intumescent material can be produced by standard paper making techniques as described, for example, in U.S. Pat. No. 3,458,329, the disclosure of which is incorporated herein by reference.

A flexible, resilient, intumescent fibrous mounting mat can be produced in several different ways, including a conventional paper-making process, either hand laid or machine laid. A handsheet mold, a Fourdrinier paper machine, or a roto-former paper machine can be employed to make the flexible, intumescent fibrous mounting mat. In any case, a flocculated aqueous slurry containing a number of components, as set forth below, is pressed to remove most of die water, and the mat is then dried. This process is well known to those skilled in the art.

In other embodiments, the flexible, fibrous mounting mat may comprise a substantially non-expanding composite sheet of high temperature resistant fibers and a binder. In certain embodiments, the mounting mat is "integral", meaning that after manufacture the mounting mat has self supporting structure, needing no reinforcing or containment layers of fabric, plastic or paper, (including those which are stitch-bonded to the mat) and can be handled or manipulated without disintegration. By "substantially non-expanding" is meant that the sheet does not readily expand upon the application of heat as would be expected with intumescent paper. Of course, some expansion of the sheet does occur based upon its thermal coefficient of expansion. The amount of expansion, however, is very insubstantial as compared to the expansion which occurs based upon intumescent properties. It will be appreciated that this type of mounting mat is substantially devoid of intumescent materials.

High temperature resistant fiber, including ceramic fibers which are useful in the non-expanding mounting mat include polycrystalline oxide ceramic fibers such as mullite, alumina, high alumina aluminosilicates, aluminosilicates, zirconia, titania, chromium oxide and the like. In certain embodiments, the fibers are refractory. When the ceramic fiber is an aluminosilicate, the fiber may contain between about 55 to about 98% alumina and between about 2 to about 45% silica, in certain embodiments with the ratio of alumina to silica being between 70 to 30 and 75 to 25. Suitable polycrystalline oxide refractory ceramic fibers and methods for producing the same are contained in U.S. Pat. Nos. 4,159,205 and 4,277,269, which are incorporated herein by reference. FIBERMAX® polycrystalline mullite ceramic fibers are available from Unifrax I LLC, Niagara Falls, N.Y. in blanket, mat or paper form. The fibers used in the non-expanding mounting mat may be substantially shot free, having very low shot content, generally on the order of about 5 percent nominally or less. The diameters of such fibers may be generally about 1 micron to about 10 microns.

The binder used in the non-expanding mounting mat is typically an organic binder which may be sacrificial in nature. By "sacrificial" is meant that the binder will eventually be burned out of the mounting mat, leaving only the fibers as the final mounting mat. Suitable binders include aqueous and nonaqueous binders, but often the binder utilized is a reactive, thermally setting latex which after cure is a flexible material that can be burned out of the installed mounting mat as indicated above. Examples of suitable binders or resins include, but are not limited to, aqueous based latexes of acrylics, styrene-butadiene, vinylpyridine, acrylonitrile, vinyl chloride, polyurethane and the like. Other resins include low temperature, flexible thermosetting resins such as unsaturated polyesters, epoxy resins and polyvinyl esters. Specific useful binders include but are not limited to HI-STRETCH V-60™, a trademark of B.F. Goodrich Co. (Akron, Ohio) for acrylonitrile based latex. Solvents for the binders can include water, or a suitable organic solvent, such as acetone, for the binder utilized. Solution strength of the binder in the solvent (if used) can be determined by conventional methods based on the binder loading desired and the workability of the binder system (viscosity, solids content, etc.).

Similarly, the non-expanding mounting mat can be prepared by conventional papermaking techniques. Using this process, the inorganic fibers are mixed with a binder to form a mixture or slurry. The slurry may then be diluted with water to enhance formation, and it may finally be flocculated with flocculating agent and drainage retention aid chemicals. Then, the flocculated mixture or slurry may be placed onto a papermaking machine to be formed into a ceramic paper mat. The mats or sheets may be formed by vacuum casting the slurry or mixture with conventional papermaking equipment and are typically dried in ovens.

Alternatively, the fibers may be processed into a mat by conventional means such as dry air laying. The mat at this stage, has very little structural integrity and is very thick relative to the conventional catalytic converter and diesel trap mounting mats. Where this alternative technique is used, the mat may be further processed by the addition of a binder to the mat by impregnation to form a discontinuous fiber composite. The binder is added after formation of the mat, rather than forming the mat prepreg as noted hereinabove with respect to the conventional papermaking technique.

In another embodiment, high index, crystallized, melt-formed refractory ceramic fibers are heat treated at temperatures above the mullite crystallization temperature of 980° C., such as temperatures ranging from 990° C. to about 1400° C. in a controlled manner to obtain specific amounts of crystallinity and crystallite size, thereby increasing fiber performance in the form of a catalytic converter mounting mat. In certain embodiments, such fibers will have at least about 5 to about 50 percent crystallinity as detected by x-ray diffraction, and a crystallite size of from about 50 Å to about 500 Å. When such fibers are employed, the mounting mat provides a minimum pressure for holding the fragile catalyst support structure within the housing of at least one of i) at least 4 psi after at least 200 cycles and/or after 1000° C. of testing at 900° C. or ii) at least about 10 psi after at least 1000 cycles of testing at 750° C.

The ceramic fibers which are useful in this embodiment are melt-formed ceramic fibers containing alumina and silica, including but not limited to melt spun refractory ceramic fibers. These include aluminosilicates, such as those aluminosilicate fibers having from about 40 to about 60 percent alumina and from about 60 to about 40 percent silica, and some embodiments, from about 47 to about 53 percent alumina and from about 47 to about 53 percent silica.

The melt-formed, spun fibers are of high purity chemically and may have an average diameter in the range of about 1 to about 14 μm, and in certain embodiments, in the range of about 3 to 6.5 μm. The fibers are beneficiated as is well known in the art to obtain a greater than 90 percent fiber index, meaning they contain less than 10 percent shot, and often only about 5 percent shot.

The ceramic fibers may be heat treated under a time-temperature regimen of one of (i) heat treating said fibers at a temperature of 990° C. to at least 1050° C. for greater than 1 hour such that the fibers have about 5 to about 50 percent crystallinity as detected by x-ray diffraction, and a crystallite size of about 50 Å to about 500 Å, or (ii) heat treating said fibers at a temperature of greater than 1050° C. for an amount of time effective to develop, in the fibers, about 5 to about 50 percent crystallinity as detected by x-ray diffraction and a crystallite size of about 50 Å to about 500 Å.

In yet another embodiment, a flexible, fibrous, non-intumescent mounting mat for a substrate in a low temperature exhaust gas treatment device comprises high temperature resistant, amorphous, inorganic fibers and optionally includes a binder. The fibers may have a use temperature up to about 1260° C., a Young's Modulus of less than about $20 \times 10^6$ psi, and a geometric mean diameter less than about 5 μm.

The fibers may comprise at least one of an amorphous alumina/silica fiber, an alumina/silica/magnesia fiber (such as S-2 Glass from Owens Corning, Toledo, Ohio), mineral wool, E-glass fiber, magnesia-silica fibers, such as ISOFRAX® fibers from Unifrax I LLC. Niagara Falls. N.Y., or calcia-magnesia-silica fibers, such as INSULFRAX® fibers from Unifrax I LLC, Niagara Falls. N.Y. or SUPERWOOL™ fibers from Thermal Ceramics Company.

The alumina/silica fiber typically comprises from about 45% to about 60% $Al_2O_3$ and about 40% to about 55% $SiO_2$; and the fiber may comprise about 50% $Al_2O_3$ and about 50% $SiO_2$. The alumina/silica/magnesia glass fiber typically comprises from about 64% to about 66% $SiO_2$, from about 24% to about 25% $Al_2O_3$, and from about 9% to about 10% MgO. The E-glass fiber typically comprises from about 52% to about 56% $SiO_2$, from about 16% to about 25% CaO, from about 12% to about 16% $Al_2O_3$, from about 5% to about 10% $B_2O_3$, up to about 5% MgO, up to about 2% of sodium oxide and potassium oxide and trace amounts of iron oxide and fluorides, with a typical composition of 55% $SiO_2$, 15% $Al_2O_3$, 7% $B_2O_3$, 3% MgO, 19% CaO and traces of the above mentioned materials.

Biosoluble magnesia-silica fibers typically comprise from about 69% to about 86% $SiO_2$, from about 14% to about 35% MgO, and from 0% to about 7% ZrO. More information on magnesia-silica fibers can be found in U.S. Pat. No. 5,874,375, which is hereby incorporated by reference. Biosoluble calcia-magnesia-silica fibers typically comprise about 15% to about 35% CaO, about 2.5% to about 20% MgO, and about 60 to about 70% $SiO_2$.

The biosoluble fibers are typically amorphous inorganic or glass fibers that may be melt-formed, are fibers of high chemical purity (greater than about 98%) and may have an average diameter in the range of about 1 to about 10 μm, and in certain embodiments, in the range of about 2 to 4 μm. While not specifically required, the fibers may be beneficiated, as is well known in the art.

Optionally, this non-intumescent mounting mat includes a binder. Suitable binders include aqueous and non aqueous binders, but the binder typically utilized is a reactive, thermally setting latex which after cure is a flexible material that is stable up to at least about 350° C. About 5 to about 10 percent latex may be employed.

This mounting mat provides a holding force of at least 15 psi throughout an average mat temperature range from ambient temperature up to at least about 350° C. The average mat temperature is the arithmetic average temperature across the entire mat. The holding force is provided across the temperature range of the mat as it is heated from ambient temperature up to at least about 350° C.

In certain embodiments, the flexible, fibrous mounting mat comprises one or more non-intumescent plies of melt-formed, amorphous, high-temperature resistant leached glass fibers having a high silica content and, optionally, includes a binder or other fibers suitable for acting as a binder. By the term "high silica content," it is meant that the fibers contain more silica than any other compositional ingredient in the fibers. In fact, the silica content of these fibers after leaching are typically greater than any other glass fibers containing silica, including S-glass fibers, except crystalline quartz derived fibers or pure silica fibers. In one embodiment, it will be appreciated that the mounting mat may be devoid of intumescent materials, sol gel-derived glass silica fibers and/or backing or reinforcing layers.

Generally, the leached glass fibers will have a silica content of at least 67 percent by weight. In certain embodiments, the leached glass fibers contains at least 90 percent by weight, and in certain of these, from about 90 percent by weight to less than 99 percent by weight silica. The fibers are also substantially shot free.

The average fiber diameter of these leached glass fibers may be greater than at least about 3.5 microns, and often greater than at least about 5 microns. On average, the glass fibers typically have a diameter of about 9 microns, up to about 14 microns. Thus, these leached glass fibers are non-respirable.

Examples of leached glass fibers high in silica content and suitable for use in the production of a mounting mat for a catalytic converter or other known gas-treating device include those leached glass fibers available from BelChem Fiber Materials GmbH, Germany, under the trademark BELCOTEX and from Hilco Carbon Composites, Inc. of Gardena Calif., under the registered trademark REFRASIL.

By further treating either the leached glass fibers prior to formation of the mounting mat, or mounting mats made from these fibers after formation, the holding pressure performance of the mounting mats can be improved sufficiently, even after cycling, to be adaptable for use in an exhaust gas treatment device. In one particular embodiment, these leached glass fibers (or the mounting mats containing them) may be heat treated at temperatures ranging from above at least about 900° C. such as from about 900° C. to about 1100° C., such that the mounting mat employing these fibers may exert the minimum required holding pressure within the exhaust gas treatment device, even after 1000 cycles of expansion and contraction.

In certain alternative embodiments, fibers such as S2-glass and the like may be added to the mounting mat in quantities of from greater than 0 to about 50 percent by weight, based upon 100 percent by weight of the total mat. In other alternative embodiments, the mounting mat may include refractory ceramic fibers in addition to the leached glass fibers. When refractory ceramic fibers, that is, alumina/silica fibers or the like are utilized, they may be present in an amount ranging from greater than 0 to less than about 50 percent by weight, based upon 100 percent by weight of the total mat.

The mounting mats may or may not include a binder. When a binder is used, the components are mixed to form a mixture or slurry. The slurry of fibers and binder is then formed into a mat structure and the binder is removed, thereby providing a mounting mat containing the heat-treated fibers (and optionally additional fibers). Typically, a sacrificial binder is employed to initially bond the fibers together.

In certain embodiments, melt-formed, leached glass fibers high in silica content are subjected to a surface treatment, which results in an increase in the holding pressure performance of the mounting mat containing a plurality of the leached, high silica containing glass fibers. Without being bound to any particular theory, it is believed that the surface treatment applied to the leach glass fibers may result in an increase of the friction of the fiber surfaces. The increase in the friction of the exterior fiber surfaces substantially reduces the amount of slippage between the fibers of the mounting mat itself, between the fibers of the mounting mat and the interior surfaces of the housing of the exhaust gas treatment device, and/or between the fibers of the mounting mat and the exterior surfaces of the fragile structure that is in contact with the mounting mat.

According to one embodiment, the exterior surfaces of the leached glass fibers may be treated by applying an inorganic particulate material to at least portions of the fiber surfaces. Useful inorganic particulate materials that may be utilized to treat the exterior of the fiber surfaces of the leached glass fibers include, without limitation, colloidal dispersions of alumina, silica, zirconia, and mixtures thereof. According to one embodiment, the inorganic material used to treat the exterior surfaces of the leached glass fibers, thereby increasing the overall holding pressure performance of the mounting mal, is a colloidal dispersion of alumina.

At least a portion of the exterior surfaces of at least a portion of the leached glass fibers of the mounting mat may include a continuous or discontinuous coating of colloidal alumina, silica, zirconia, and mixtures thereof. The colloidal oxide may be applied to the exterior surfaces of the leached glass fibers by any suitable means, without limitation, by coating, dipping, spraying, splashing, and the like. The colloidal oxide may be applied to the exterior surfaces of the leached glass fibers in either a continuous or discontinuous pattern. Moreover, the process of applying the colloidal oxide to the exterior surfaces of the leached glass fibers may be carried out during or after manufacture of the glass fibers.

Flexible, fibrous mourning mats for fragile substrates of exhaust gas treatment devices are disclosed in U.S. Pat. Nos. 4,863,700, 5,032,441, 5,384,188, 5,482,686, 5,580,532, 5,666,726, 5,811,063, 6,231,818, 6,855,298, 7,033,412, and US Patent Application Publication No. 2006/0008395, all of which are incorporated herein by reference as if fully written out below.

The mounting mat may comprise only one or more intumescent fibrous mats, or only one or more non-intumescent fibrous mats, as well as combinations of at least one intumescent and at least one non-intumescent mat or layer within a hybrid mat.

Additionally, separate mounting mats may contact either surface of the microporous insulation layer, such as, by way of example but not limitation at least one intumescent mat proximate to the substrate and at least one non-intumescent mal proximate to the housing.

As an exhaust gas treatment device cycles from ambient temperature to operating temperature, the components comprising the device reach their individual operating temperatures. The operating temperature for any given component in the exhaust gas treatment device may be less than the operating temperature for the device itself, because some components are insulated from higher temperature components. As components heat, they will expand in proportion to their thermal expansion coefficients.

This expansion produces a change in the strain state of the component. Because all components will not experience identical thermal strain, thermal strain causes component interference forces to change. That is, a change in the strain state of the component causes a corresponding change in the stress state of the component, and a resultant change in the forces between it and other components with which it is engaged.

In certain embodiments, the insulating layer is disposed to engage the substrate directly, a fibrous mounting mat is disposed over the insulating layer and engages it directly, and a housing is disposed over the mounting mat and engages it directly. In other embodiments, the fibrous mounting mat is disposed to engage the substrate directly, an insulating layer is disposed over the mounting mat and engages it directly, and a housing is disposed over the insulating layer and engages it directly.

In embodiments in which an insulation layer is positioned between the substrate and the mounting mat, the insulation layer insulates the mounting mat, and all other components installed on the cold side of the insulating layer (cold side components), from the substrate and heat flowing from the substrate, and thereby promotes lower operating temperatures for the mounting mat and other cold side components than the operating temperature of the substrate.

Because ambient temperature is lower than the operating temperature of the fibrous mounting mat, promotion of lower mounting mat operating temperature and other cold side components operating temperatures decreases both the amplitude of temperature change and the maximum temperature experienced by the mounting mat and other cold side components during any given operational cycle. The decrease in the amplitude of temperature change results in a corresponding decrease in the amplitude of the change in thermal strain of the mounting mat and other cold side components. Because a change in the strain state of the component causes a corresponding change in the stress state of the component, and a resultant change in the forces between it and other components with which it is engaged, decreasing the amplitude of the change in thermal strain of a component results in a decrease in the change in the forces between it and other components with which it is engaged.

The substrate is held in place by mounting forces developed from compression by other components. These mounting forces are subject to an upper and lower design limit. The upper limit is the force required to cause damage to the substrate: the mounting forces are not sufficient to harm the substrate. The lower limit is the maximum displacement force which the substrate will experience in service; the mounting forces are at least sufficient to hold the substrate in place against all displacement forces experienced in service. As noted above, thermal strain can cause the actual mounting forces developed during the course of operation to fluctuate. By insulating the components which develop the mounting forces, the amplitude of the change in thermal strain of the components is decreased as is the amplitude of the change in the mounting forces between them and the substrate. By decreasing the amplitude of the change in the mounting forces between other components and the substrate, maintaining the mounting forces within their design limits is simplified.

In embodiments in which the fibrous mounting mat is positioned between the substrate and the insulation layer, the insulation layer insulates the mounting mat from the ambient environment and permits higher mounting mat operating temperatures than the alternative. In certain embodiments, the fibrous mounting mat additionally comprises intumescent materials. In those embodiments in which the mounting mat comprises intumescent materials, the positioning of the mounting mat between the substrate and the insulation layer permits mounting mat operating temperatures high enough to induce the intumescent response in the intumescent materials.

The system will be described with respect to the illustrative embodiments shown in FIGS. 2 and 3. It should be noted that the embodiments shown in FIGS. 2 and 3 are intended to be merely illustrative and should not be considered to limit the substrate mounting system or the exhaust gas treatment device in any manner.

Figure 2:
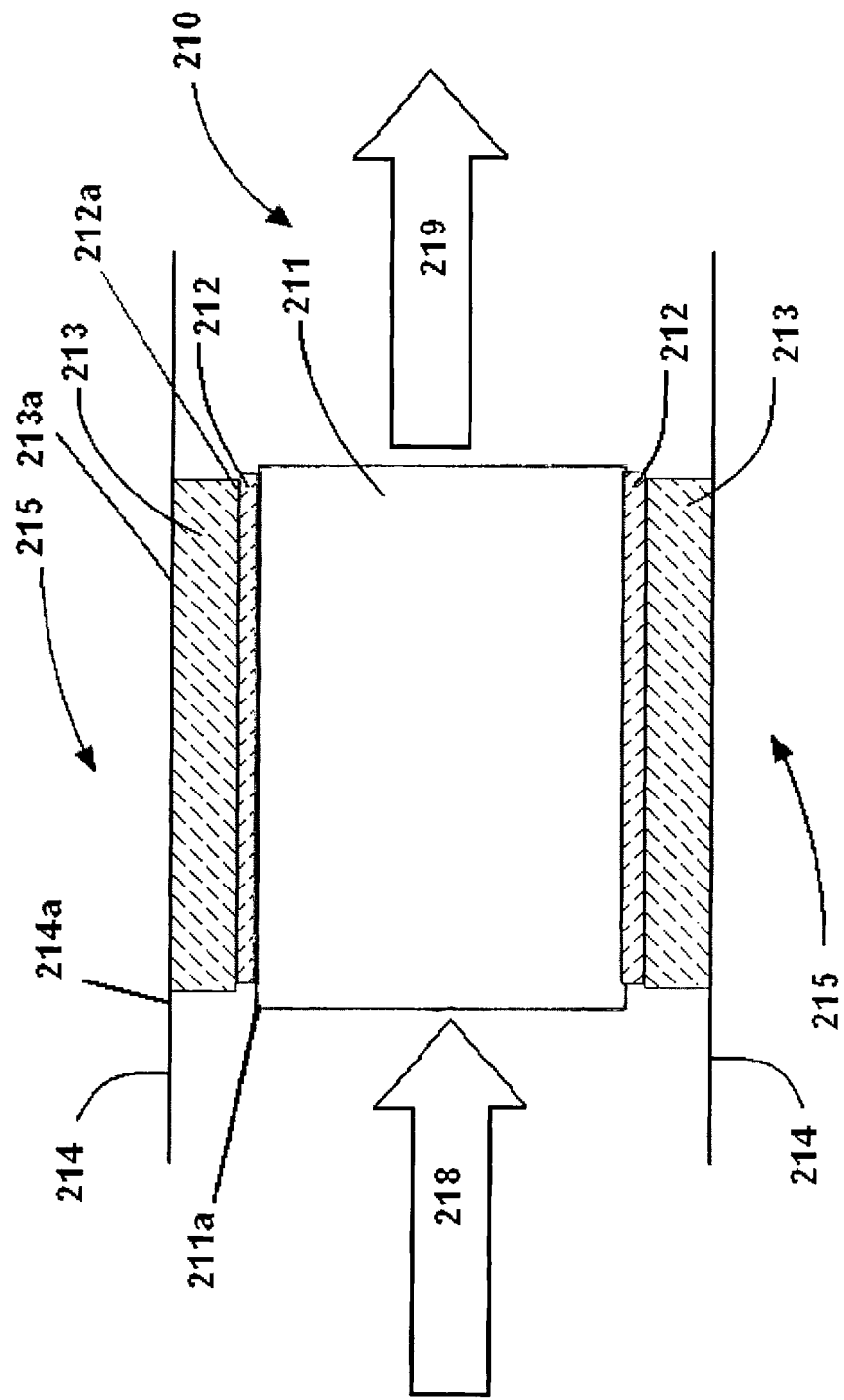
FIG. 2 is a schematic cross-sectional view illustrating one embodiment of a mounting system for supporting a fragile substrate.

Referring to FIG. 2, exhaust gas treatment device 210 is shown in cross-section. Exhaust gas treatment device 210 comprises an elongated substrate 211 through which exhaust gas flows axially. Untreated exhaust gas 218 enters a first end of the elongated substrate 211. Exhaust gas is treated within the body of the elongated substrate 211. Treated exhaust gas 219 exits a second end of the elongated substrate 211. The elongated substrate 211 comprises an outer surface 211a of which at least a portion may be directly engaged by an insulating layer 212 wrapped substantially about the elongated substrate 211. Insulating layer 212 comprises an outer surface 212a of which at least a portion may be directly engaged by a fibrous mounting mat 213 wrapped substantially about the insulating layer 212. Mounting mat 213 comprises an outer surface 213a which may be directly engaged by shell 214 enclosing the mounting mat 213. The shell 214 has an outer surface 214a which is exposed to the ambient environment 215.

Figure 3:
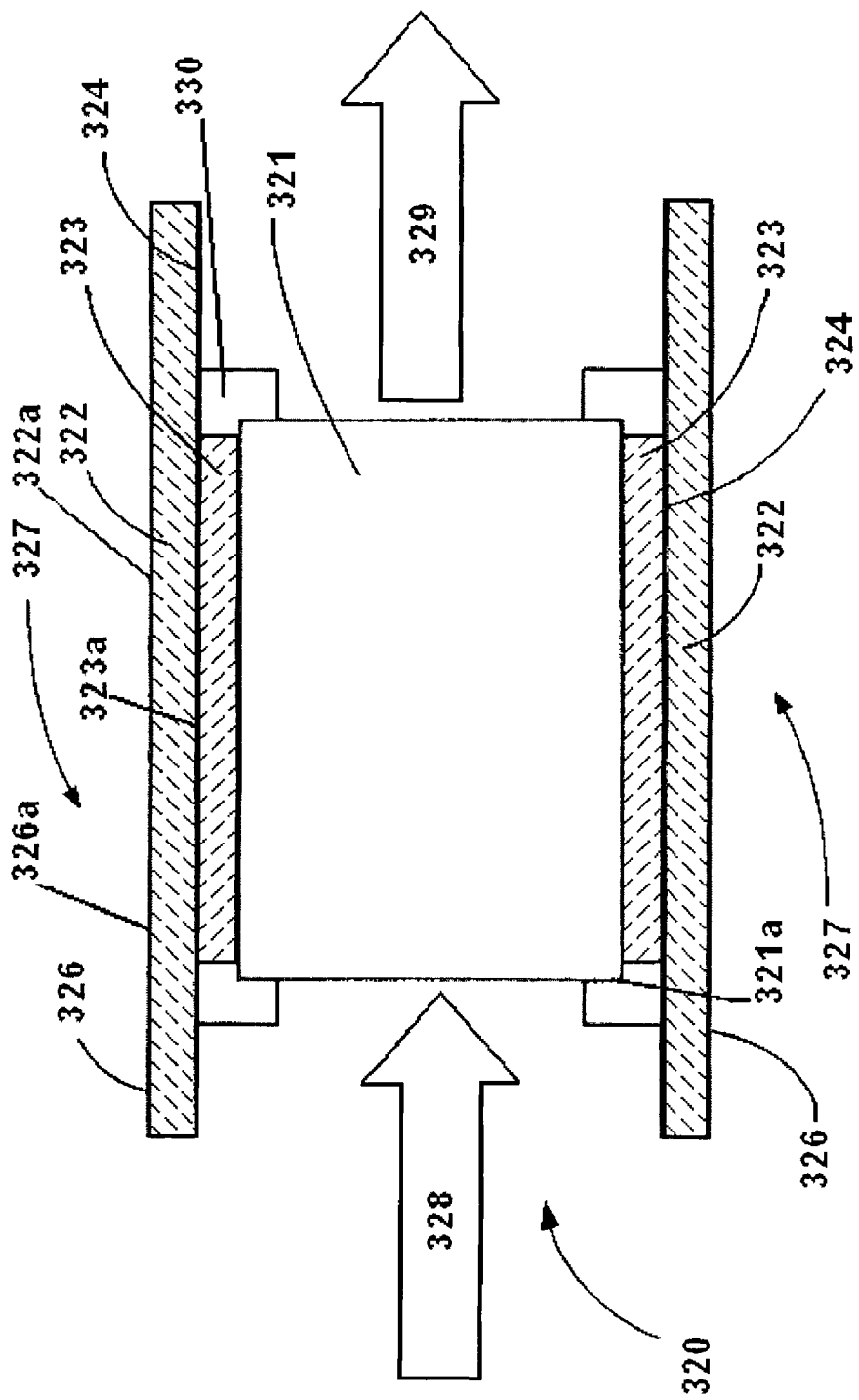
FIG. 3 is a schematic cross-sectional view illustrating another embodiment of a mounting system for supporting a fragile substrate.

Referring to FIG. 3, exhaust gas treatment device 320 is shown in cross-section. Exhaust gas treatment device 320 comprises an elongated substrate 321 through which exhaust gas flows axially. Untreated exhaust gas 328 enters a first end of the elongated substrate 321. Exhaust gas is treated within the body of the elongated substrate 321. Treated exhaust gas 329 exits a second end of the elongated substrate 321. The elongated substrate 321 comprises an outer surface 321a of which at least a portion is directly engaged by a fibrous mounting mat 323 wrapped substantially about the elongated substrate 321. The elongated substrate is optionally engaged by one or more sealing rings 330. Mounting mat 323 comprises an outer surface 323a which is directly engaged by insulation layer 322 wrapped at least substantially about the mounting mat 323. Insulating layer 322 comprises an outer surface 322a which is directly engaged by a shell 326 enclosing insulating layer 322. The shell 326 has an outer surface 326a which is exposed 10 the ambient environment 327.

Figure 4:
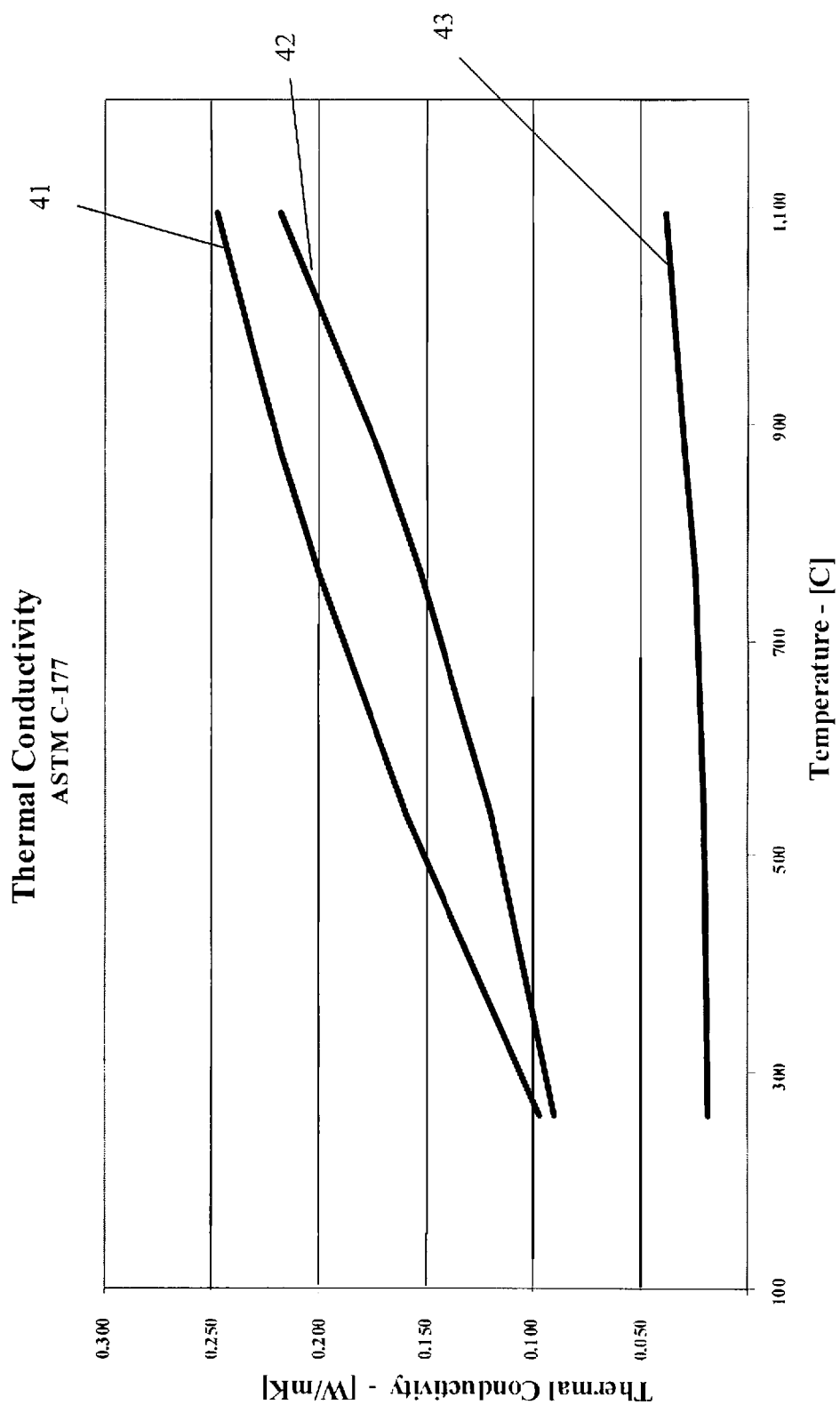
FIG. 4 is a graph illustrating the results of an ASTM-C177 test of thermal conductivity vs. temperature for various materials.

Testing has been performed using samples of WDS® Flexible Contour from Porextherm GmbH of Kempten, Germany, a microporous inorganic insulating layer material, and using samples of a typical intumescent and a typical non-intumescent fibrous mounting mat material. Testing in accord with ASTM-C177 was performed upon each of the fibrous mounting mat materials and the subject insulating layer material. Data relating the thermal conductivity with respect to temperature was generated for each of the three materials. The resultant data is plotted as a graph in FIG. 4. In summary, at temperatures ranging from 300 to 1000 degrees Centigrade, the microporous inorganic insulating layer material, labeled line 43, consistently had a thermal conductivity of less than 0.055 W/mK while both the fibrous mounting mat materials, the typical intumescent material labeled line 41 and the typical non-intumescent material labeled line 42, consistently had a thermal conductivity of greater than 0.080 W/mK. The subject insulating layer material was an insulator superior to either of the mounting mat materials at all temperatures.

The mounting mats may comprise only one or more intumescent fibrous mats, or only one or more non-intumescent fibrous mats, as well as combinations of at least one intumescent and at least one non-intumescent mat or layer within a hybrid mal. Additionally, at least one mounting mat may contact both surfaces of the microporous insulation layer, such as, by way of example but not limitation, at least one intumescent mat disposed proximate to the substrate and at least one non-intumescent mat disposed proximate to the housing.

Hot Face/Cold Face Test:

Hot face/cold face measurement tests have been performed upon samples incorporating a fibrous mounting mat and a microporous insulation layer and upon samples incorporating a fibrous mounting mat without a microporous insulation layer. A description of the tests follow. The tests show the effect of the presence of the microporous inorganic insulation layer on the resultant cold face of the mounting system.

Substrates were housed in a mounting system which contained either a non-intumescent mat or a combination of a non-intumescent mat with microporous insulation. The systems had the same approximate housing-substrate gap and similar gap bulk densities. The interface between the mat and the substrate was heated to 950° C. using resistive heating elements. The system was allowed to soak at 950° C. for 1 hour and the cold face temperature was monitored using thermocouples welded to the housing surface. The results are the average of two systems. The results are shown in Table II.

TABLE II

| Mounting Material | Gap (mm) | Cold Face Temp (° C.) |
|---|---|---|
| Non-intumescent mat | 6.99 ± 0.000 | 353 |
| Microporous insulation + Non-intumescent mat | 6.83 ± 0.060 | 308 |

The tests show the significant thermal insulation benefit of the microporous inorganic insulating layer; the microporous inorganic insulating layer promotes lower cold face temperatures.

Cyclic Test:

As noted hereinabove, the temperature cycles which a mounting system endures during its lifetime have an adverse impact on the mounting forces created by certain mounting systems. Without exploring the several mechanisms which collectively produce this phenomenon, the phenomena is correlated to a high number and high amplitude of temperature cycles to which certain mounting mats are subject. As a result, and as noted above, placement of certain non-intumescent mounting mats on the cold side of a microporous inorganic insulation layer can promote high cycle functionality by reducing temperature amplitude which may otherwise adversely impact performance.

1000 cycle tests were performed to determine the impact of the presence of microporous insulation on mounting system performance. In each lest, the material layer tested was compressed between upper and lower platens on the test equipment to a constant maximum pressure (Pmax) of 500 kPa. The gap width resulting from the application of the 500 kPa stress load was the "test gap". Using a finite element thermal analysis model, a "thermal gap expansion" was calculated to predict the expected gap width change due to thermal changes from ambient to operating temperatures. An "expanded gap" width was calculated by adding the calculated thermal gap expansion width to the test gap width. The upper and lower platens were heated independently to the hot face and cold face temperatures, respectively. Once the desired temperatures were reached, the gap was cycled between the test gap and expanded gap 1000 times. The pressure measured at the expanded gap on the $1000^{th}$ cycle is reported as the $P_{min,1000}$ value in Table III.

The microporous insulation substantially reduced the shell temperature and gap expansion amplitude. The lest conditions and results are listed in Table III below.

TABLE III

| Material | HF/CF Temps (° C.) | % Gap Exp | Pmax (kPa) | Pmin, 1000 (kPa) |
|---|---|---|---|---|
| Non-intumescent (NI) mat | 950/450 | 6.8 | 491 | 15.1 |
| WDS | 950/250 | 1.5 | 495 | 14.8 |
| NI with WDS | 950/300 | 1.8 | 490 | 99.8 |

The mounting performance is measured in mounting pressure produced by the mounting system. After 1000 cycles the mounting system consisting of a non-intumescent fibrous mounting mat alone produced 15.1 kPa of mounting force, the mounting system consisting of WDS insulation alone produced 14.8 kPa of mounting force, while the mounting system consisting of a non-intumescent mat AND a layer of WDS insulation produced 99.8 kPa of mounting force. This data demonstrates that the inclusion of microporous inorganic insulating material as defined above in the mounting system mitigates the adverse effects of temperature cycling.

While the system has been described in connection with various embodiments, as shown in the various figures, it is to be understood that other similar embodiments may be used or modifications and additions may be made to the described embodiments for performing the same function. Furthermore, the various illustrative embodiments may be combined to produce the desired results. Therefore, the substrate mounting system and exhaust gas treatment device should not be limited to any single embodiment, but rather construed in breadth and scope in accordance with the recitation of the appended claims.

I claim:

1. A support system for a fragile substrate of an exhaust gas treatment device comprising:
   a microporous, inorganic insulating layer adapted to directly or indirectly engage at least a portion of the fragile substrate; and
   a flexible fibrous mounting mat adapted to directly or indirectly engage at least a portion of the fragile substrate.

2. The support system of claim 1, wherein the inorganic insulating layer comprises finely divided metal oxide and an opacifier, optionally further comprising reinforcing inorganic fiber.

3. The support system of claim 2, wherein the finely divided metal oxide comprises at least one of pyrogenic silicas, arc silicas, low-alkali precipitated silicas, silicon dioxide aerogels, pyrogenic aluminum oxides, arc aluminum oxides, low-alkali precipitated aluminum oxides, aluminum oxide aerogels, and mixtures thereof.

4. The support system of claim 2, wherein the opacifier comprises at least one of ilmenite, titanium dioxide, iron(II)/iron(III) mixed oxides, chromium dioxide, zirconium oxide, manganese dioxide, iron oxide, rutile, zirconium silicate, silicon carbide, and mixtures thereof.

5. The support system of claim 2, wherein the reinforcing fiber comprises fibers of at least one of aluminum silicate, magnesium silicate, rockwool, textile glass fibers or quartz fibers, or combinations thereof.

6. The support system of claim 2, wherein the inorganic insulating layer comprises silicon dioxide and zirconium silicate, and optionally a reinforcing glass filament.

7. The support system of claim 6, wherein the inorganic insulating layer has a specific heat capacity of about 0.8 KJ/kgK for temperatures from about 20° C. to about 800° C.

8. The support system of claim 1, wherein the inorganic insulating layer has a modulus of elasticity of greater than about 3 MPa for strains less than 0.02, and has a bulk density of greater than or equal to about 260 kg/m$^3$.

9. The support system of claim 1, wherein the inorganic insulating layer has a thermal conductivity less than 0.055 W/mK for mean temperatures less than 1000° C.

10. The support system of claim 1, wherein the inorganic insulating layer has a bulk density between about 260 kg/m$^3$ and about 520 kg/m$^3$.

11. An exhaust gas treatment device comprising a housing, a fragile substrate and a support system for the fragile substrate comprising:
    a microporous, inorganic insulating layer adapted to directly or indirectly engage at least a portion of the fragile substrate; and
    a flexible fibrous mounting mat adapted to directly or indirectly engage at least a portion of the fragile substrate.

12. The exhaust gas treatment device of claim 11, further comprising a metallic housing enclosing the fragile substrate, the microporous inorganic insulating layer, and the mounting mat.

13. The exhaust gas treatment device of claim 12, wherein the inorganic insulating layer is directly engaged with the fragile substrate.

14. The exhaust gas treatment device of claim 13, wherein the fibrous mounting mat is disposed between the inorganic insulating layer and the housing.

15. The exhaust gas treatment device of claim 14, wherein the fibrous mounting mat is substantially non-intumescent.

16. The exhaust gas treatment device of claim 12, wherein the fibrous mounting mat is directly engaged with the fragile substrate.

17. The exhaust gas treatment device of claim 16, wherein the fibrous mounting mat is intumescent.

18. The exhaust gas treatment device of claim 12, comprising a plurality of fibrous mounting mats.

19. The exhaust gas treatment device of claim 12, wherein said fragile substrate is a catalytic converter monolith or a diesel particulate filter adapted to receive exhaust gases from an internal combustion engine.

20. The exhaust gas treatment device of claim 12, wherein the fragile substrate is disposed within a selective catalyst reduction unit, an NO$_x$ trap or a chemical industry emission stack.

* * * * *